United States Patent
Bae et al.

(10) Patent No.: US 9,105,906 B2
(45) Date of Patent: *Aug. 11, 2015

(54) SEPARATOR FOR RECHARGEABLE LITHIUM BATTERY AND RECHARGEABLE LITHIUM BATTERY INCLUDING SAME

(71) Applicant: Samsung SDI Co., Ltd., Yongin-si, Gyeonggi-do (KR)

(72) Inventors: Tae-Hyun Bae, Yongin-si (KR); Woo-Cheol Shin, Yongin-si (KR); Sang-Il Han, Yongin-si (KR); Jung-Yi Yu, Yongin-si (KR); Myung-Hwan Jeong, Yongin-si (KR); Myung-Hoon Kim, Yongin-si (KR); Moon-Sung Kim, Yongin-si (KR); Sang-Geun Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 21 days.

This patent is subject to a terminal disclaimer.

(21) Appl. No.: 13/828,932

(22) Filed: Mar. 14, 2013

(65) Prior Publication Data

US 2014/0050989 A1    Feb. 20, 2014

(30) Foreign Application Priority Data

Aug. 20, 2012   (KR) .................. 10-2012-0090695

(51) Int. Cl.
  *H01M 2/16* (2006.01)
  *H01M 2/14* (2006.01)
  *H01M 10/052* (2010.01)

(52) U.S. Cl.
  CPC ............ *H01M 2/16* (2013.01); *H01M 2/145* (2013.01); *H01M 2/1653* (2013.01); *H01M 2/14* (2013.01); *H01M 10/052* (2013.01); *Y10T 29/49108* (2015.01)

(58) Field of Classification Search
  CPC ......... H01M 2/14; H01M 2/145; H01M 2/16; H01M 2/1653
  USPC ....................................................... 429/246
  See application file for complete search history.

(56) References Cited

U.S. PATENT DOCUMENTS

2010/0221965 A1*  9/2010  Katayama et al. ............. 442/59
2011/0003210 A1   1/2011  Lim et al.

FOREIGN PATENT DOCUMENTS

| JP | 07-235329 | 9/1995 |
| JP | 2011-076748 | 4/2011 |
| KR | 1020040021955 A | 3/2004 |
| KR | 10-2011-0003131 A | 1/2011 |

\* cited by examiner

*Primary Examiner* — Jane Rhee
(74) *Attorney, Agent, or Firm* — Knobbe Martens Olson & Bear LLP

(57) ABSTRACT

Disclosed is a separator having surface energy of about 45 mN to about 50 mN/m which can be prepared by radiating plasma on a polymer film under a current of from about 1800 mA to about 2000 mA and electric power of from about 2750 W to about 3000 W. Further disclosed is a rechargeable battery comprising the separator having a surface energy of about 45 mN to about 50 mN/m.

17 Claims, 6 Drawing Sheets

SEPARATOR FOR RECHARGEABLE LITHIUM BATTERY AND RECHARGEABLE LITHIUM BATTERY INCLUDING SAME

CROSS-REFERENCE TO RELATED APPLICATIONS

This application claims priority to and the benefit of Korean Patent Application No. 10-2012-0090695 filed in the Korean Intellectual Property Office on Aug. 20, 2012, the entire contents of which are incorporated herein by reference.

BACKGROUND

1. Field

A separator for rechargeable lithium battery and a rechargeable lithium battery including the same are disclosed.

2. Description of the Related Art

Due to reductions in size and weight of portable electronic equipments, and popularization of portable electronic devices, researches on rechargeable lithium batteries having high energy density for power source of portable electronic devices have been actively made. Rechargeable lithium batteries include a negative electrode, a positive electrode, and an electrolyte, and generate electrical energy by oxidation and reduction reactions when lithium ions are intercalated/deintercalated in the positive electrode and negative electrode.

Such rechargeable lithium batteries use a lithium metal, a carbon-based material, Si, and the like for a negative active material. For a positive active material of rechargeable lithium batteries, metal chalcogenide compounds being capable of intercalating and deintercalating lithium ions, and for example, composite metal oxide such as $LiCoO_2$, $LiMn_2O_4$, $LiNiO_2$, $LiNi_{1-x}Co_xO_2$ (0<x<1), $LiMnO_2$, and the like has been used.

SUMMARY

One embodiment provides a separator for rechargeable lithium battery having excellent wettability for an electrolyte.

Another embodiment provides a rechargeable lithium battery including the separator and having high-capacity and excellent cycle-life characteristics.

According to one embodiment, provided is a separator for rechargeable lithium battery having surface energy of about 45 mN to about 50 mN/m.

The separator includes an oxygen-containing functional group bonded with the surface. The oxygen-containing functional group may be a ketone group or an ester group.

The separator may be fabricated by radiating plasma under a current of from about 1800 mA to about 2000 mA and electric power of from about 2750 W to about 3000 W on a polymer film. Herein, the polymer film may be polyethylene, polypropylene, polyvinylidene fluoride, or a combination thereof.

The separator may have a surface contact angle of from about 60° to about 65° against water.

The separator may have a surface contact angle of from about 33° to about 37° against diiodomethane.

According to another embodiment, provided is a rechargeable lithium battery that includes a positive electrode including a positive active material; a negative electrode including a negative active material; the separator, and an electrolyte.

The separator according to the embodiment has excellent wettability for an electrolyte and thus, may provide a rechargeable lithium battery having excellent capacity and cycle-life characteristics.

DETAILED DESCRIPTION OF THE PREFERRED EMBODIMENT

Example embodiments will hereinafter be described in detail. However, these embodiments are examples, and this disclosure is not limited thereto.

According to one embodiment, a separator for rechargeable lithium battery having surface energy of about 45 mN to about 50 mN/m is provided. The separator has higher surface energy than a conventional separator (about 30 mN/m to about 35 mN/m) and is expected to become more hydrophilic. When the surface energy is within the range, the separator becomes more hydrophilic and better impregnated in an electrolyte and thus, may improve battery performance, for example, capacity and cycle-life characteristics of a lithium rechargeable battery.

Figure 1:
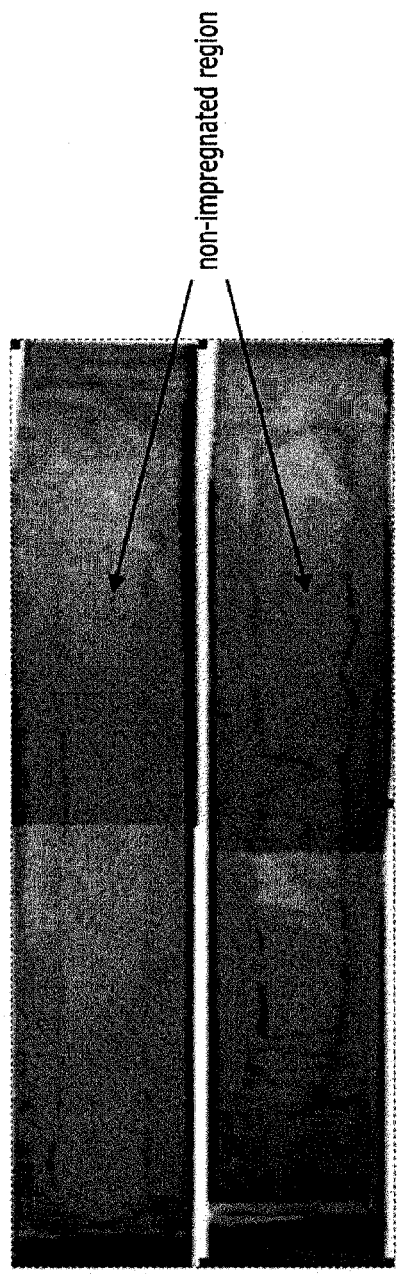
FIG. 1 is a photograph showing wettability of a conventional separator for an electrolyte.

In general, a separator plays a role of electrically separating positive and negative electrodes and passing lithium ions between the two electrodes. When the separator has better wettability in an electrolyte, the separator has better lithium ion mobility. When an electrolyte is generally present by impregnating in a separator in a battery, the separator may not be fully impregnated as shown in FIG. 1, which may deteriorate lithium ion mobility.

Accordingly, if an electrolyte is uniform, overall, and fast impregnated in a separator, the separator may improve battery characteristics. According to one embodiment, a separator has excellent impregnation property in an electrolyte and thus, may improve battery characteristics.

The separator includes an oxygen-containing functional group bonded with the surface. The oxygen-containing functional group may be a ketone group (C=O) or an ester group (COO).

In this way, when a separator has an oxygen-containing functional group bonded on the surface, the functional group separates and recombines $O_2$ and $H_2$ in the air during the plasma treatment of the separator and thus, may leave lots of OH groups on the surface and improve impregnation property of the separator.

The separator may have a surface contact angle (surface roughness) against water from about 60° to about 65°. When the separator has a surface contact angle within the range, the separator may have increased surface energy and thus, improved impregnation property.

The separator may have a surface contact angle against diiodomethane from about 33° to about 37°. When the separator has a surface contact angle against diiodomethane within the range, the separator may have increased surface energy and thus, improved impregnation property.

The separator according to one embodiment may be fabricated by radiating plasma under a current of from about 1800 mA to about 2000 mA and electric power of from about 2750 W to about 3000 W on a polymer film. When the plasma is radiated on a polymer film, the surface of the polymer film may be modified and form an electrolyte layer having the aforementioned properties.

The polymer film may be any material used as a separator for a rechargeable lithium battery and for example, include polyethylene, polypropylene, polyvinylidene fluoride, or a combination thereof. In addition, the polymer film may be a single layer or a multi-layer. Examples of the polymer film may include polyethylene, polypropylene, polyvinylidene fluoride, or a multilayer of more than two thereof, a polyethylene/polypropylene bilayer, a polyethylene/polypropylene/poly-ethylene triple layer, a polypropylene/polyethylene/polypropylene triple layer.

When the plasma radiation is performed out of at least one of the current and electric power ranges, a separator has surface energy out of the range of about 45 mN/m to about 50 mW/m and thus, no improved wettability for an electrolyte. In addition, the separator may have inappropriate contact angles against water and diiodomethane out of the range of about 60° to about 65° and about 33° to about 37° respectively.

This plasma radiation is performed by radiating plasma formed by applying a voltage under the discharge current and discharge electric power conditions between two plasma discharge electrodes on the polymer film. Herein, a gap (a discharge gap) between the plasma discharge electrode and the polymer film may be controlled to be about 1 mm to about 3 mm.

In addition, the plasma is radiated on a polymer film at a line speed of from about 8 m/min to 10 m/min.

The plasma radiation may be performed under a pressure of from about 1 atm to about 1.5 atm at a temperature of from about 22° C. to about 30° C.

When the plasma radiation is performed within the speed, pressure, and temperature ranges, the polymer film may have an appropriate plasma effect without doing any damage due to overcurrent.

According to another embodiment, provided is a rechargeable lithium battery including a separator according to the one embodiment, positive and negative electrodes, and an electrolyte.

The positive electrode includes a current collector and a positive active material layer on the current collector.

The positive active material may include a compound that reversibly intercalates and deintercalates lithium (a lithiated intercalation compound), which may be any positive active material used in a rechargeable lithium battery. Specifically, a composite oxide of at least one of cobalt, manganese, nickel, or combination thereof, and lithium may be used.

Examples may be compounds represented by the following formulae:

$Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0 \leq b \leq 0.5$, $0 \leq c \leq 0.05$); $Li_aE_{2-b}X_bO_{4-c}D_c$ ($0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 < \alpha < 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$) $Li_aCo_{1-b}G_bO_2$ ($0.90 \leq a \leq 1.8$, $0 \leq b \leq 0.1$); $Li_aMn_{1-b}G_bO_2$ ($0.90 \leq a \leq 1.8$, $0 \leq b \leq 0.1$); $Li_aMn_{2-b}G_bO_4$ ($0.90 \leq a \leq 1.8$, $0 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMnG_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $Li_aFePO_4$ ($0.90 \leq a \leq 1.8$).

In the above formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method such as spray coating, dipping, and the like, but is not illustrated in more detail since it is well-known to those who work in the related field.

In the positive active material layer, a positive active material may be included in a ratio of about 90 wt % to about 98 wt % based on the total weight of the positive active material layer.

The positive active material layer includes a binder and a conductive material. The binder and conductive material may be respectively included in an amount of from about 1 wt % to about 5 wt % based on the total weight of the positive active material layer.

The binder improves binding properties of the positive active material particles to each other and to a current collector. Examples of the binder include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material provides an electrode with conductivity. Any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material such as metal powder or metal fiber including copper, nickel, aluminum, silver, and the like; a conductive polymer such as polyphenylene derivative, or a mixture thereof.

The current collector may be Al, but is not limited thereto.

The negative electrode includes a current collector and a negative active material layer disposed on the current collector, and the negative active material layer includes a negative active material.

The negative active material includes a material that reversibly intercalates/deintercalates lithium ions, a lithium metal, a lithium metal alloy, a material being capable of doping/dedoping lithium, or a transition metal oxide.

The material that can reversibly intercalate/deintercalate lithium ions includes a carbon material. The carbon material may be any generally-used carbon-based negative active material in a lithium ion rechargeable battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, and the like.

Examples of the lithium metal alloy include lithium and an element selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may include Si, a Si—C composite, $SiO_x$ ($0<x<2$), a Si-Q alloy (wherein Q is an element selected from an alkali metal, an alkaline-earth metal, a Group 13 element, a Group 14 element, a Group 15 element, a Group 16 element, a transition element, a rare earth element, and a combination thereof, and not Si), Sn, $SnO_2$, a Sn—R alloy (wherein R is an element selected from an alkali metal, an alkaline-earth metal, a Group 13 element, a Group 14 element, a Group 15 element, a Group 16 element, a transition element, a rare earth element, and a combination thereof, and not Sn), and the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide includes vanadium oxide, lithium vanadium oxide, and the like.

In the negative active material layer, the negative active material may be included in an amount of about 95 wt % to about 99 wt % based on the total weight of the negative active material layer.

The negative active material layer may include a binder, and optionally a conductive material. The negative active material layer may include about 1 wt % to about 5 wt % of a binder based on the total weight of the negative active material layer. When the negative active material layer includes a conductive material, the negative active material layer includes about 90 wt % to about 98 wt % of the negative active material, about 1 wt % to about 5 wt % of the binder, and about 1 wt % to about 5 wt % of the conductive material.

The binder improves binding properties of negative active material particles with one another and with a current collector. The binder includes a non-water-soluble binder, a water-soluble binder, or a combination thereof.

The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder includes a styrene-butadiene rubber, an acrylated styrene-butadiene rubber, polyvinyl alcohol, sodium polyacrylate, a copolymer of propylene and a $C_2$ to $C_8$ olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be Na, K, or Li. The cellulose-based compound may be included in an amount of about 0.1 to about 3 parts by weight based on 100 parts by weight of the negative active material.

The conductive material is included to provide electrode conductivity. Any electrically conductive material may be used as a conductive material unless it causes a chemical change. Examples of the conductive material include carbon-based materials such as natural graphite, artificial graphite, carbon black, acetylene black, ketjen black, carbon fibers, and the like; metal-based materials of metal powder or metal fiber including copper, nickel, aluminum, silver, and the like; conductive polymers such as polyphenylene derivatives; or a mixture thereof.

The current collector may include one selected from a copper foil, a nickel foil, a stainless steel foil, a titanium foil, a nickel foam, a copper foam, a polymer substrate coated with a conductive metal, and a combination thereof, but is not limited thereto.

The negative and positive electrodes may be manufactured in a method of mixing the active material, a conductive material, and a binder with an active material composition and coating the composition on a current collector, respectively. The electrode-manufacturing method is well known and thus, is not described in detail in the present specification. The solvent may include N-methylpyrrolidone and the like DeletedTexts but is not limited thereto. When the negative electrode includes a water-soluble binder, the negative active material composition may use water as a solvent.

The electrolyte can include a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, methylpropinonate, ethylpropinonate, y-butyrolactone, decanolide, valerolactone, mevalonolactone, caprolactone, and the like. The ether-based solvent includes dibutyl ether, tetraglyme, diglyme, dimethoxyethane, 2-methyltetrahydrofuran, tetrahydrofuran, or the like, and the ketone-based solvent include cyclohexanone, or the like. The alcohol-based solvent include ethyl alcohol, isopropyl alcohol, and the like, and the aprotic solvent include nitriles such as R—CN (wherein R is a $C_2$ to $C_{20}$ linear, branched, or cyclic hydrocarbon group including a double bond, an aromatic ring, or an ether bond), amides such as dimethylformamide, dioxolanes such as 1,3-dioxolane, sulfolanes, or the like.

The non-aqueous organic solvent may be used singularly or in a mixture. When the organic solvent is used in a mixture, the mixture ratio can be controlled in accordance with a desirable battery performance.

The carbonate-based solvent is prepared by mixing a cyclic carbonate and a linear carbonate. The cyclic carbonate and the linear carbonate are mixed together in the volume ratio of about 1:1 to about 1:9. Within this range, performance of electrolyte may be improved.

In addition, the non-aqueous organic electrolyte may be further prepared by mixing a carbonate-based solvent with an aromatic hydrocarbon-based solvent. The carbonate-based and the aromatic hydrocarbon-based solvents may be mixed together in a volume ratio of from about 1:1 to about 30:1.

The aromatic hydrocarbon-based organic solvent may be represented by the following Chemical Formula 1.

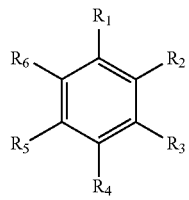

[CHEMICAL FORMULA 1]

In Chemical Formula 1, $R_1$ to $R_6$ are each independently selected from hydrogen, a halogen, a C 1 to C10 alkyl group, a C 1 to C10 haloalkyl group, and a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate, or an ethylene carbonate-based compound represented by the following Chemical Formula 2 to improve cycle-life.

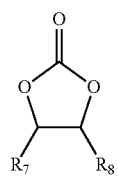

[CHEMICAL FORMULA 2]

In Chemical Formula 2, $R_7$ and $R_8$ are independently selected from hydrogen, hydrogen, a halogen, a cyano group (CN), a nitro group ($NO_2$), and a C1 to C5 fluoroalkyl group, provided that at least one of $R_7$ and $R_8$ is selected from a halogen, a cyano group (CN), a nitro group ($NO_2$), and a C1 to C5 fluoroalkyl group.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound used to improve cycle life may be adjusted within an appropriate range.

The lithium salt is dissolved in an organic solvent, supplies lithium ions in a battery, operates a basic operation of the rechargeable lithium battery, and improves lithium ion transportation between positive and negative electrodes therein. Examples of the lithium salt include $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)$ $(C_yF_{2y+1}SO_2)$, (where x and y are natural numbers), LiCl, LiI, $LiB(C_2O_4)_2$ (lithium bis(oxalato)borate, LiBOB), or a combination thereof, as a supporting electrolytic salt. The lithium salt may be used in a concentration of from 0.1 M to 2.0 M. When the lithium salt is included at the above concentration range, an electrolyte may have excellent performance and lithium ion mobility due to optimal electrolyte conductivity and viscosity.

Figure 2:
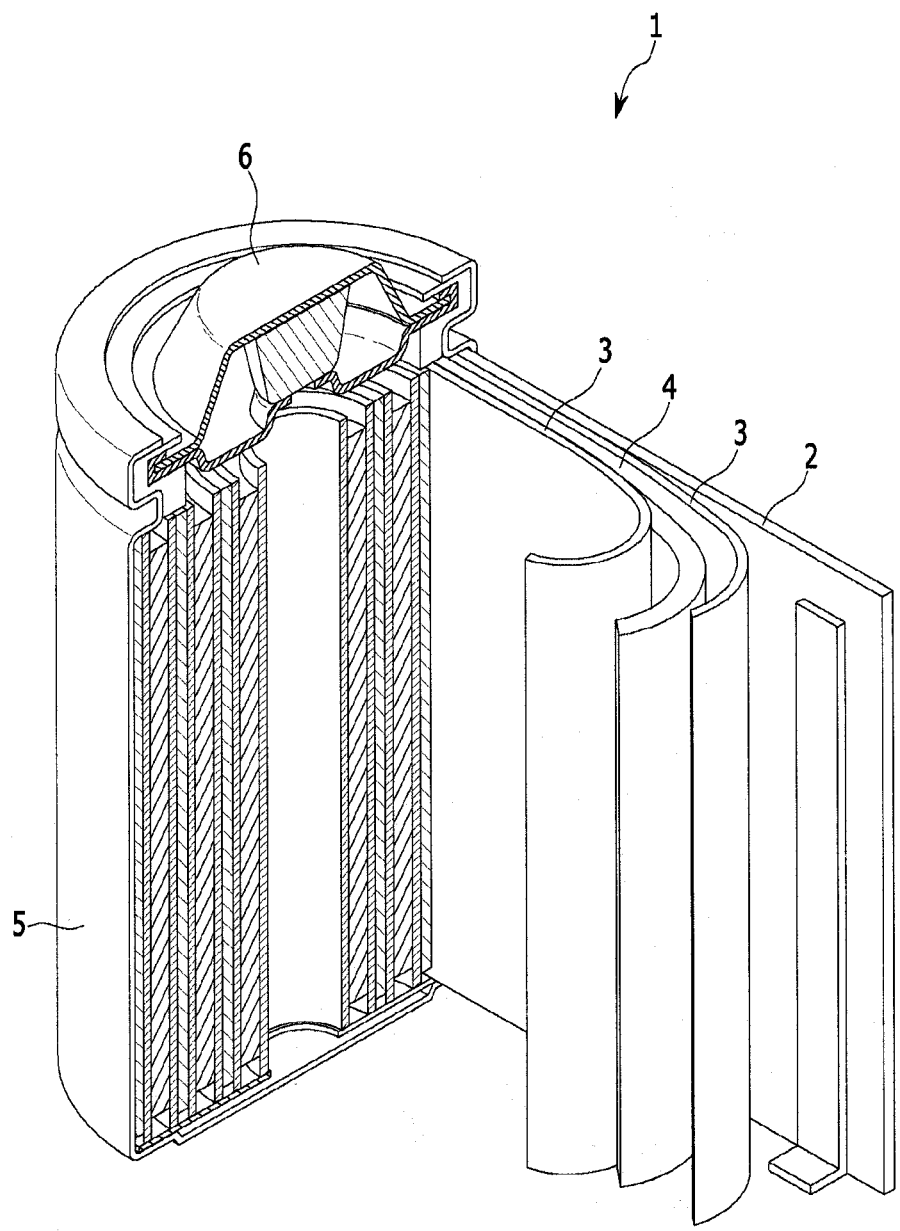
FIG. 2 is a schematic view showing a structure of a rechargeable lithium battery according to one embodiment.

FIG. 2 is a schematic view showing the representative structure of a rechargeable lithium battery according to one embodiment. As shown in FIG. 1, the rechargeable lithium battery 1 includes a positive electrode 2, a negative electrode 4, and a separator interposed between the positive electrode 2 and negative electrode 4, an electrolyte 3 immersed therein, a battery case 5, and a sealing member 6 sealing the battery case 5.

The following examples illustrate the present embodiments in more detail. These examples, however, should not in any sense be interpreted as limiting the scope of the present embodiments.

Example 1

A plasma was radiated on a polyethylene polymer film under a condition of 1 atm (760 Torr) and 2° C., to fabricate a separator. Herein, the plasma radiation was performed by applying a voltage with a discharge current of 1800 mA and a discharge electric power of 2800 W between two plasma discharge electrodes. In addition, the gap between the plasma discharge electrodes and the polymer film was controlled to obtain 3 mm and the plasma discharge electrodes was set to pass the polymer film and radiate plasma thereon at a speed of 8 m/min.

Comparative Example 1

A polyethylene polymer film was used.

Comparative Example 2

A separator was fabricated according to the same method as Example 1 except for applying a voltage with 2500 mA of a discharge current and 3000 W of a discharge electric power between two plasma discharge electrodes.

Comparative Example 3

A separator was fabricated according to the same method as Example 1 except for applying a voltage with 2000 mA of a discharge current and 3200 W of a discharge electric power between two plasma discharge electrodes.

Comparative Example 4

A separator was fabricated according to the same method as Example 1 except for applying a voltage with 2500 mA of a discharge current and 3200 W of a discharge electric power between two plasma discharge electrodes.

Example 2

The separator according to Example 1 was spirally wound with positive and negative electrodes to make a jelly roll, and the jelly roll was housed in a cylindrical battery case. Then, an electrolyte was injected into the cylindrical battery case, fabricating a cylindrical rechargeable lithium battery cell.

Herein, the positive electrode was fabricated by mixing a $LiCoO_2$ positive active material, a denka black conductive material, and a polyvinylidene fluoride binder in an N-methyl pyrrolidone solvent in a weight ratio of 94:3:3 to prepare a positive active material composition and coating the positive active material composition on an Al current collector.

The negative electrode was fabricated by mixing a graphite negative active material, a styrene butadiene rubber binder, and a carboxylmethyl cellulose thickener in a weight ratio of 94:3:3 in a water to prepare a negative active material composition and coating the negative active material composition on a Cu current collector.

The electrolyte was prepared by mixing ethylene carbonate, ethylmethyl carbonate, and dimethyl carbonate in a volume ratio of 3:4:3 to prepare an organic solvent and dissolving 1.3M of a $LiPF_6$ lithium salt therein.

Comparative Example 5

A rechargeable lithium battery cell was fabricated according to the same method as Example 2 except for using the separator according to Comparative Example 1.

Comparative Example 6

A rechargeable lithium battery cell was fabricated according to the same method as Example 2 except for using the separator according to Comparative Example 2.

Comparative Example 7

A rechargeable lithium battery cell was fabricated according to the same method as Example 2 except for using the separator according to Comparative Example 3.

Comparative Example 8

A rechargeable lithium battery cell was fabricated according to the same method as Example 2 except for using the separator according to Comparative Example 4.

*Experiment of Electrolyte Impregnation

In Example 2 and Comparative Example 5, the rechargeable lithium battery cells were decomposed one hour later after injecting the electrolyte and measured about impregnation degree of the electrolyte.

Figure 3:
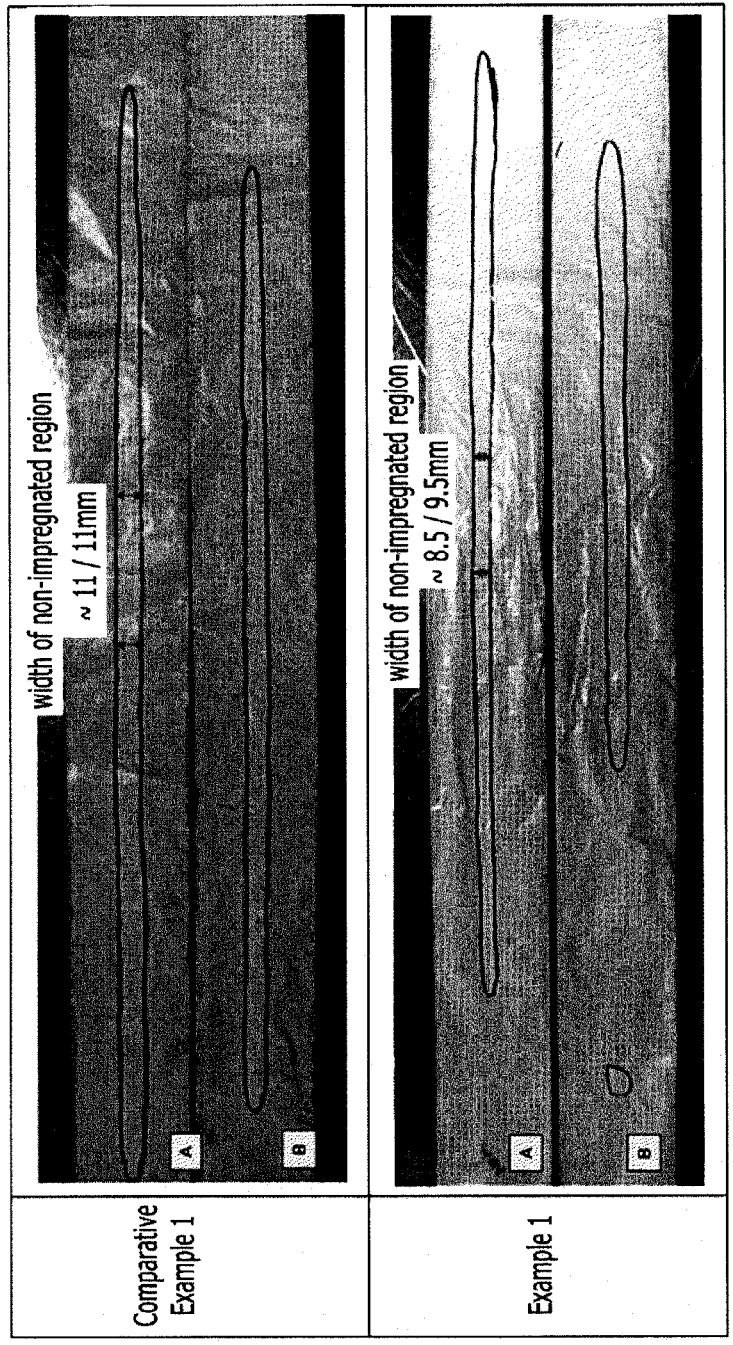
FIG. 3 is a photograph showing wettability of separators of Example 1 and Comparative Example 1 for an electrolyte.

FIG. 3 shows a photograph showing the surface measurements of the separators in the decomposed battery cells. Referring to FIG. 3, A shows the separator between the positive and negative electrodes in Example 1 and Comparative Example 1, and B shows one side of the separator contacting with the negative electrode. As shown in FIG. 3, the width non-impregnated region of the separator of Example 1 was about 8.5 mm and about 9.5 mm, while the width of the non-impregnated region of the separator of Comparative Example 1 was about 11 mm A and about 11 mm. Accordingly, Example 1 had a smaller non-impregnated region than Comparative Example 1.

Figure 4:
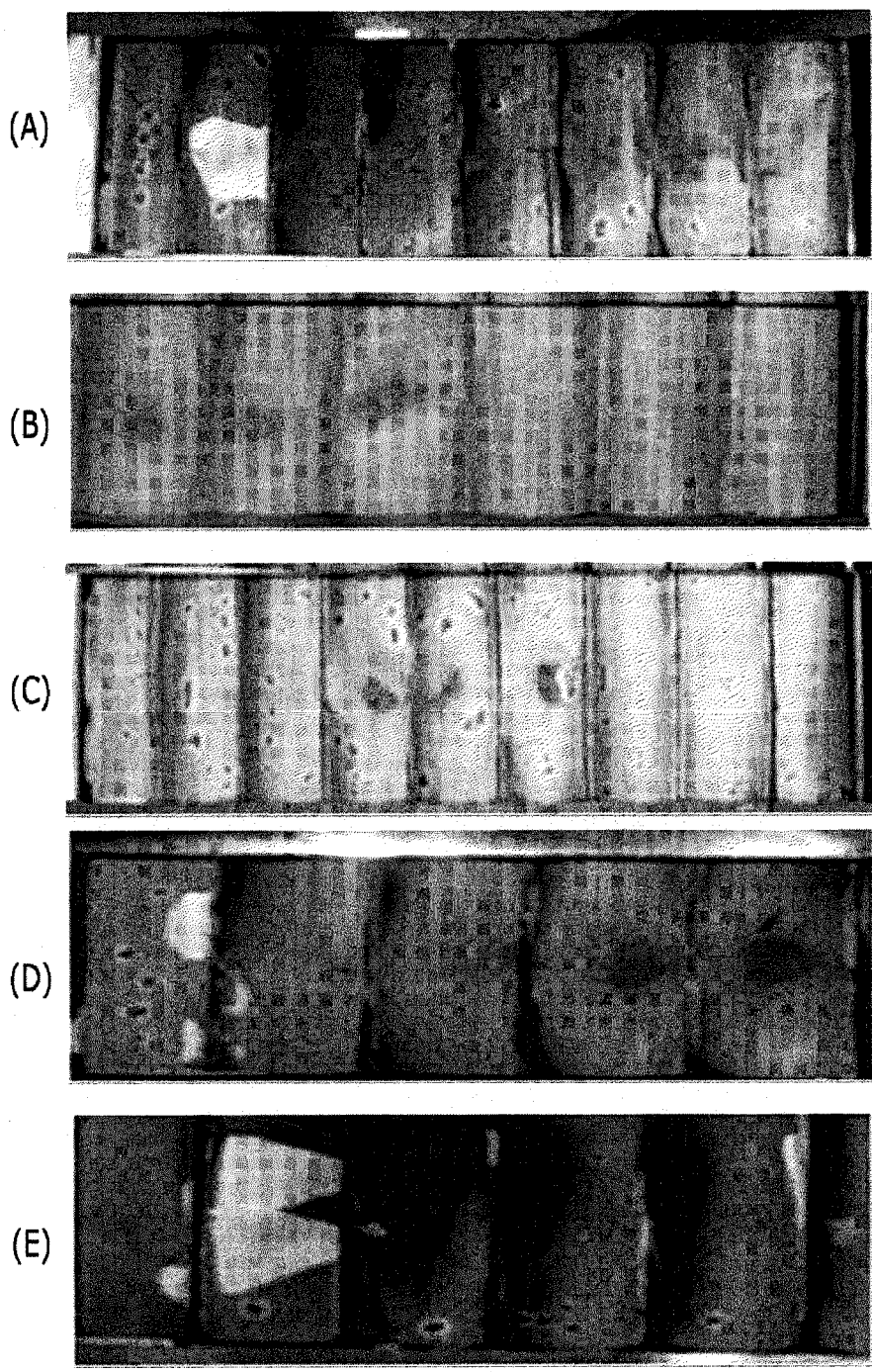
FIG. 4 is a photograph showing the surface of the separators of Example 1 and Comparative Examples 1 to 4 after impregnated in an electrolyte.

Then, the battery cells according to Example 2 and Comparative Examples 5 to 8 were charged and discharged with 0.2 C at room temperature and charged and discharged at room temperature with 0.5 C (formation charge and discharge) and then, decomposed and measured regarding impregnation degree of the electrolyte. FIG. 4 (A: Comparative Example 1, B: Example 1, C: Comparative Example 2, D: Comparative Example 3, E: Comparative Example 4) shows photographs of the surface of the separators from the decomposed battery cells. As shown in FIG. 4-B, the separator of Example 2 had a smooth surface, since the separator was uniformly impregnated in the electrolyte, but the other separators were not uniformly impregnated in the electrolyte regardless of plasma radiation as shown in FIGS. 4-A, C, D, and E if the plasma radiation was performed under in appropriate conditions.

*IR Spectrum Measurement

Figure 5:
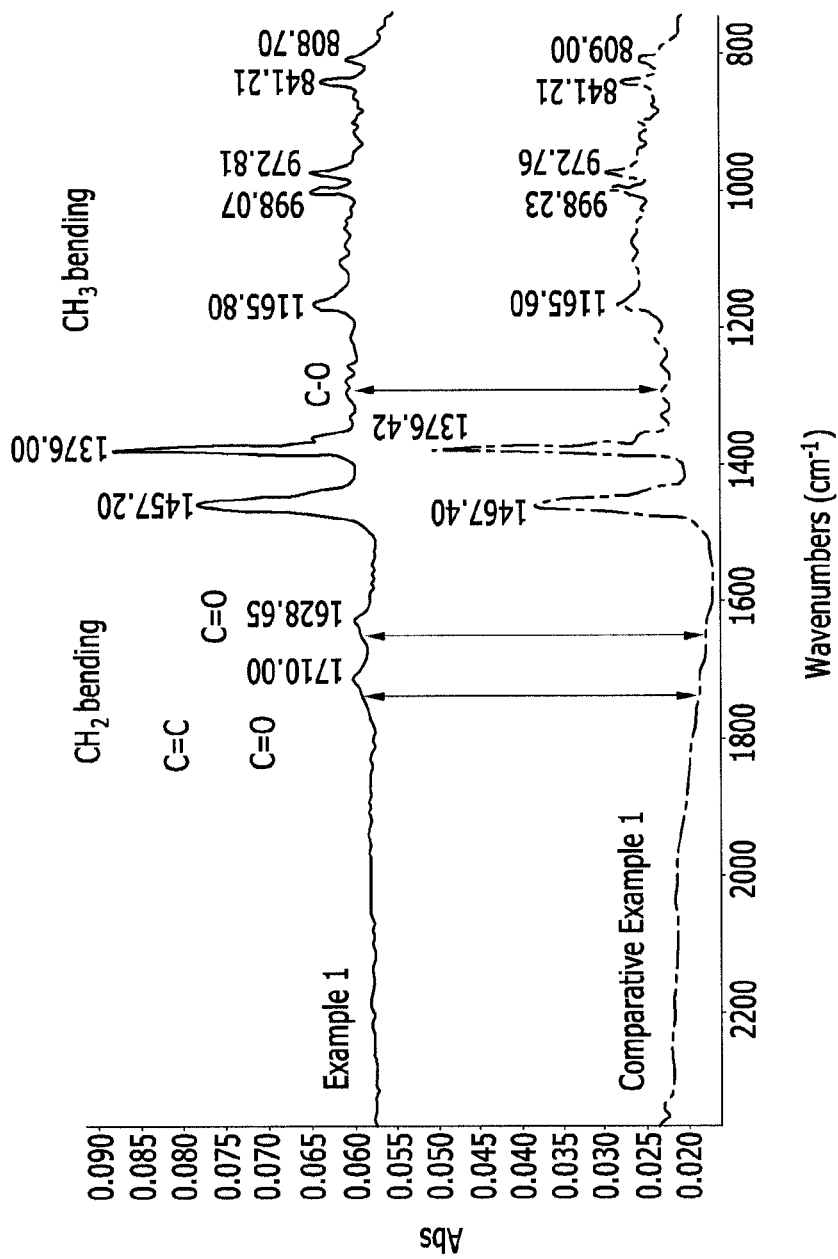
FIG. 5 is a graph showing IR spectra of the separators of Example 1 and Comparative Example 1.

The separators according to Example 1 and Comparative Example 1 were measured regarding IR spectrum. The results are provided in FIG. 5. As shown in FIG. 5, the separator according to Example 1 had a ketone group (C=O) (about 1710 $cm^{-1}$) and an ester group (C=O, C—O, about 1630 $cm^{-1}$, 1270 $cm^{-1}$) on the surface.

On the other hand, the separator according to Comparative Example 1 had no aforementioned peaks, which shows that the separator had no aforementioned functional on the surface.

*Contact Angle and Surface Energy

The separators according to Example 1 and Comparative Examples 1 to 4 were measured regarding contact angle and surface energy. The results are provided in the following Table 1.

TABLE 1

|  | Contact angle | | Surface energy |
| --- | --- | --- | --- |
|  | Water | diiodomethane | (mN/m) |
| Comparative Example 1 | 102.9° | 56.2° | 30.96 |
| Example 1 | 63.1° | 35.3° | 45.56 |
| Comparative Example 2 | 53° | 30.2° | 54.8 |
| Comparative Example 3 | 55° | 31.7° | 52.4 |
| Comparative Example 4 | 50.3° | 29.6° | 56 |

As shown in Table 1, the separator treated with plasma under appropriate current and voltage conditions according to Example 1 had appropriate contact angles against water and diiodomethane and surface energy of from 45 mN/m to 50 mN/m. On the contrary, the separator having no plasma treatment according to Comparative Example 1 had larger contact angles against water and diiodomethane but too small surface energy.

In addition, the separators treated with plasma under inappropriate current and voltage conditions according to Comparative Examples 2 to 4 had too small contact angle against water and diiodomethane and too high surface energy.

*Cycle-life Characteristics

Figure 6:
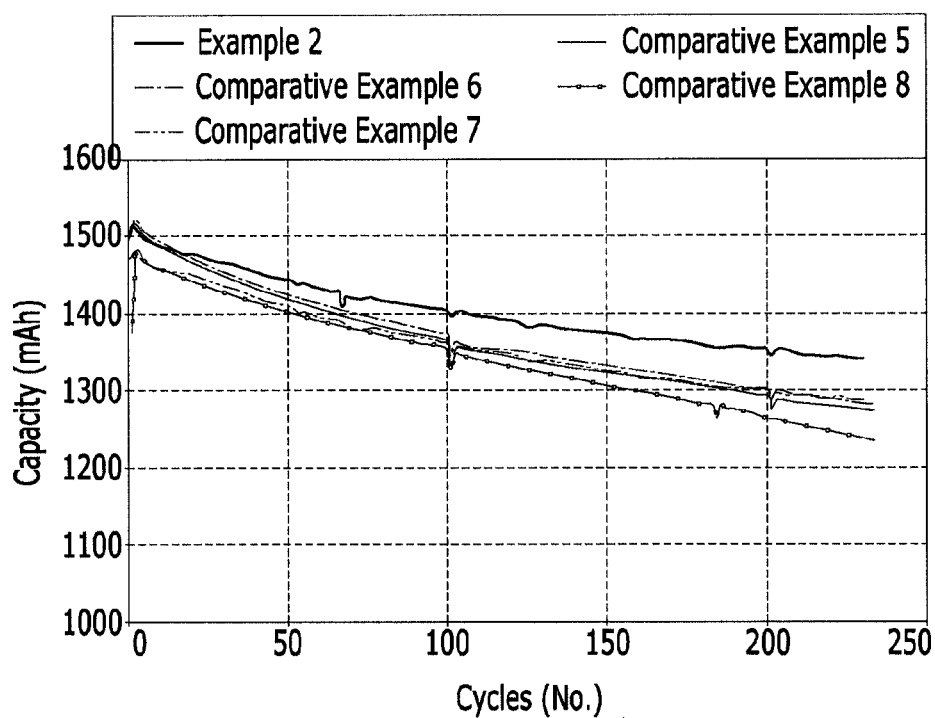
FIG. 6 is a graph showing cycle-life characteristic of rechargeable lithium battery cells according to Example 2 and Comparative Examples 5 to 8.

The rechargeable lithium battery cells according to Example 2 and Comparative Examples 5 to 8 were 240 times charged and discharged with 1 C and measured regarding discharge capacity. The results are provided in FIG. 6. As shown in FIG. 6, the battery cells according to Example 2 and Comparative Examples 5 to 8 had similar initial capacity, but the cell according to Example 2 had more deteriorated capacity than the cells according to Comparative Examples 5 to 8 as the cycles increased. Accordingly, the cell Example 2 had better cycle-life characteristics than the ones according to Comparative Examples 5 to 8.

While these embodiments have been described in connection with what is presently considered to be practical example embodiments, it is to be understood that the embodiments are not limited to the disclosed embodiments, but, on the contrary, is intended to cover various modifications and equivalent arrangements included within the spirit and scope of the appended claims.

What is claimed is:

1. A separator for a rechargeable lithium battery having surface energy of about 45 mN/m to about 50 mN/m, which has a surface contact angle against water from about 60° to about 65°.

2. The separator of claim 1, wherein an oxygen-containing functional group is bonded to the surface thereof.

3. The separator of claim 2, wherein the oxygen-containing functional group is a ketone group or an ester group.

4. The separator of claim 1, wherein the separator has been fabricated by radiating plasma on a polymer film under a current of from about 1800 mA to about 2000 mA and electric power of from about 2750 W to about 3000 W.

5. The separator of claim 4, wherein the polymer film comprises polyethylene, polypropylene, polyvinylidene fluoride, or a combination thereof.

6. The separator of claim 1, which has a surface contact angle against diiodomethane from about 33° to about 37°.

7. A rechargeable lithium battery comprising:
a positive electrode comprising a positive active material;
a negative electrode comprising a negative active material,
a separator having surface energy of about 45 mN to about 50 mN/m, and an electrolyte,
wherein the separator has a surface contact angle against water from about 60° to about 65°.

8. The rechargeable lithium battery of claim 7, wherein an oxygen-containing functional group is bonded to the surface of the separator.

9. The rechargeable lithium battery of claim 8, wherein the oxygen-containing functional group is a ketone group or an ester group.

10. The rechargeable lithium battery of claim 7, wherein the separator has been fabricated by radiating plasma on a polymer film under a current of from about 1800 mA to about 2000 mA and electric power of from about 2750 W to about 3000 W.

11. The rechargeable lithium battery of claim 10, wherein the polymer film comprises polyethylene, polypropylene, polyvinylidene fluoride, or a combination thereof.

12. The rechargeable lithium battery of claim 7, wherein the separator has a surface contact angle against diiodomethane from about 33° to about 37°.

13. A method of making a separator for a rechargeable lithium battery having surface energy of about 45 mN/m to about 50 mN/m comprising:
radiating plasma on a polymer film under a current of from about 1800 mA to about 2000 mA and electric power of from about 2750 W to about 3000 W,
wherein the separator has a surface contact angle against water from about 60° to about 65°.

14. The method of claim 13, wherein the polymer film comprises polyethylene, polypropylene, polyvinylidene fluoride, or a combination thereof.

15. The method of claim 13, wherein the separator has a surface contact angle against diiodomethane from about 33° to about 37°.

16. The method of claim 13, wherein an oxygen-containing functional group is bonded to the surface of the separator.

17. The method of claim 16, wherein the oxygen-containing functional group is a ketone group or an ester group.

* * * * *